(12) United States Patent
Ueda et al.

(10) Patent No.: US 6,892,527 B2
(45) Date of Patent: May 17, 2005

(54) CATALYST DETERIORATION SUPPRESSING APPARATUS AND METHOD

(75) Inventors: Katsunori Ueda, Okazaki (JP); Masaaki Kaneko, Aichi (JP); Kojiro Okada, Nagoya (JP); Ishido Masanori, Atsugi (JP); Yasuki Tamura, Nisshin (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/619,622

(22) Filed: Jul. 16, 2003

(65) Prior Publication Data

US 2004/0050036 A1 Mar. 18, 2004

(30) Foreign Application Priority Data

Jul. 16, 2002 (JP) .................................. 2002-206673
Jul. 16, 2002 (JP) .................................. 2002-206674

(51) Int. Cl.$^7$ ............................................. F01N 3/00
(52) U.S. Cl. .................... 60/277; 60/274; 60/285; 60/286; 123/481; 123/198 F
(58) Field of Search ................... 60/274, 277, 285, 60/286; 123/481, 198 F

(56) References Cited

U.S. PATENT DOCUMENTS

| 5,570,575 | A | * | 11/1996 | Sato et al. ................... 60/277 |
| 5,795,992 | A | * | 8/1998 | Tanahashi et al. ......... 73/23.31 |
| 5,884,477 | A | * | 3/1999 | Andou et al. ................ 60/285 |
| 6,128,899 | A | * | 10/2000 | Oono et al. ................... 60/295 |
| 6,560,960 | B2 | * | 5/2003 | Nishimura et al. ........... 60/284 |

FOREIGN PATENT DOCUMENTS

| JP | 55-137339 A | 10/1980 |
| JP | 6-63468 B2 | 8/1994 |
| JP | 8-144814 A | 6/1996 |

* cited by examiner

Primary Examiner—Binh Q. Tran
(74) Attorney, Agent, or Firm—Birch, Stewart, Kolasch & Birch, LLP

(57) ABSTRACT

A catalyst deterioration suppressing apparatus and method stops supply of fuel when an engine is decelerating, and prohibits the supply of fuel from being stopped when the catalyst temperature is equal to or higher than a predetermined temperature when the engine is decelerating. When the supply of fuel is prohibted from being stopped, the air-fuel ratio is prohibited from being feedback-controlled. As a result, it is possible to control the air-fuel ratio in a stable manner while suppressing deterioration of a catalyst.

16 Claims, 6 Drawing Sheets

CATALYST DETERIORATION SUPPRESSING APPARATUS AND METHOD

CROSS-REFERENCE TO THE RELATED ART

This application incorporates by reference the subject matter of Application No. 2002-206673, filed in Japan on Jul. 16, 2002, and Application No. 2002-206674, filed in Japan on Jul. 16, 2002, on which a priority claim is based under 35 U.S.C. §119(a).

BACKGROUND OF THE INVENTION (1) Field of the Invention

The present invention relates to a catalyst deterioration suppressing apparatus and method for suppressing deterioration of an exhaust purifying catalyst that purifies toxic substances in exhaust gas emitted from an engine.

(2) Description of Related Art

Generally, as the temperature of the exhaust gas increases and the atmosphere of the exhaust gas becomes more oxidized (the air-fuel ratio becomes leaner), an exhaust purifying catalyst (hereinafter referred to as "the catalyst") disposed in an exhaust passage of an engine for purifying toxic substances in exhaust gas is more likely to deteriorate by heat due to sintering (the phenomenon in which particles held on a carrier are agglomerated to increase the particle diameter) or the like. Thus, the temperature which the catalyst can resist is lower in oxidized atmosphere than in oxygen reduced atmosphere (where the air-fuel ratio is rich).

Therefore, to suppress such a heat deterioration of the catalyst, it is necessary to surely avoid the situation where the catalyst temperature becomes high and the catalyst is exposed to oxidized atmosphere.

In recent years, to reduce $CO_2$, which leads to reduction in fuel consumption, a vehicle has been put into practical use which is equipped with a fuel cut device that is capable of temporarily shutting off supply of fuel (i.e. cutting fuel) to all or part of cylinders disposed in an engine when the vehicle is brought into a predetermined operative state, e.g. a decelerating state while running.

However, when fuel is cut as mentioned above, only air is emitted from the cylinder or cylinders for which fuel has been cut, the exhaust air-fuel ratio is likely to be lean.

Therefore, in the case of the above described engine, a catalytic converter is exposed to oxidized atmosphere and the temperature thereof becomes high with a high frequency when fuel is cut.

To address this problem, the technique has been disclosed in Japanese Laid-Open Patent Publication (Kokai) No. 55-137339 in which fuel is prohibited from being cut when the catalyst temperature is high. Also, the technique has been disclosed in Japanese Laid-Open Patent Publication (Kokai) No. 8-144814 has been disclosed in which fuel is prohibited from being cut when the catalyst bed temperature estimated based on the intake air volume is high, or fuel is prohibited from being cut based on the engine speed and the engine load.

Generally, when fuel injection is controlled, the fuel injection quantity is feedback controlled so that the actual air-fuel ratio can be equal to the target air-fuel ratio.

However, when fuel is prohibited from being cut as described above, the driver does not depress an accel pedal, and hence an engine is operating in an operative range where the intake air volume and the opening time (injector pulse width) of a fuel injection valve are extremely small. As shown in FIG. 6, in this operative range, the linearity of the fuel injection quantity with respect to the injector pulse width deteriorates. If the fuel injection quantity is feedback controlled in this operative range, it is impossible to provide proper control because the integration correction value for feedback-control cannot be stable as described in Japanese Patent Publication No. 6-63468, or for other reasons. This leads to deterioration of exhaust gas, and makes it impossible to control the air-fuel ratio in a stable manner. If the air-fuel ratio becomes lean as a result, the catalyst is brought into oxidized atmosphere, accelerating deterioration of the catalyst.

It should be noted that, the intake air volume is also small while the engine is idling, and on this occasion, positive torque, enough to rotate the engine against friction in engine revolution, is required. On the other hand, positive torque is not required in decelerating, and if positive torque is generated, a sense of deceleration cannot be obtained since the engine is rotating freely without decelerating. For this reason, when fuel is prohibited from being cut in decelerating, it is necessary to generate such a slight torque as to obtain a sense of deceleration. Specifically, engine torque in idling is greater than torque generated when fuel is prohibited from being cut in decelerating.

Therefore, the intake air volume and the fuel injection quantity in idling are greater than those while fuel is prohibited from being cut in decelerating. Thus, while the engine is idling, there is no problem with the linearity since the intake air volume and the fuel injection quantity are greater than those while fuel is prohibited from being cut in decelerating.

It is therefore an object of the present invention to provide a catalyst deterioration suppressing apparatus capable of suppressing deterioration of the catalyst by controlling the air-fuel ratio in a stable manner even in an operative range where the intake air volume is extremely small and the linearity of the fuel injection quantity deteriorates while fuel is being prohibited from being cut.

SUMMARY OF THE INVENTION

To attain the above object, the present invention provides a catalyst deterioration suppressing apparatus that suppresses deterioration of an exhaust purifying catalyst which purifies toxic substances in exhaust gas emitted from an engine, comprising a catalyst temperature estimating element that detects or estimates a temperature of the catalyst; a fuel supply stopping element that stops supply of fuel to the engine during deceleration; a fuel supply stop prohibiting element operable when the catalyst temperature estimating element determines that the temperature of the catalyst lies in a high temperature range equal to or greater than a predetermined temperature, for prohibiting the fuel supply stopping element from stopping the supply of fuel; an air-fuel ratio control element that feedback-controls an air-fuel ratio such that the air-fuel ratio is equal to a target air-fuel ratio set based on an operative state of the engine; and a feedback control prohibiting element operable when the fuel supply stop prohibiting element prohibits the supply of fuel from being stopped, for prohibiting the air-fuel ratio control element from providing feedback control.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

A description will hereunder be given of a catalyst deterioration suppressing apparatus according to preferred embodiments of the present invention with reference to the accompanying drawings.

First, a description will be given of a first embodiment.

Figure 1:
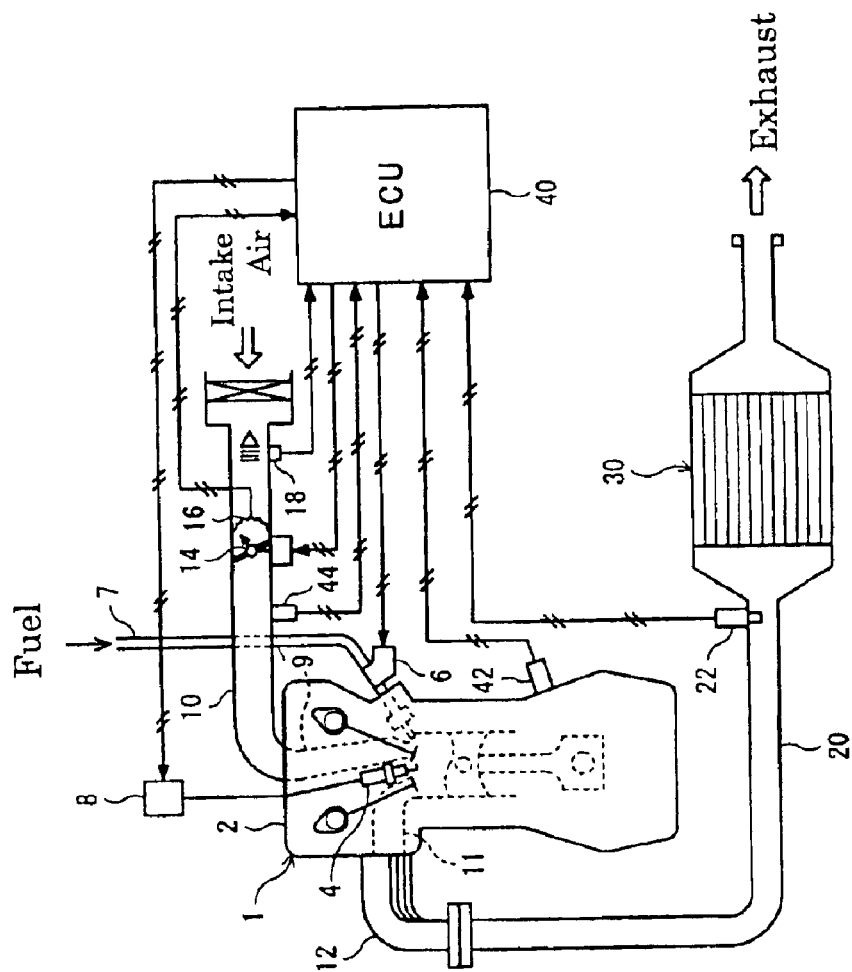
FIG. 1 is a view schematically showing the entire construction of a catalyst deterioration suppressing apparatus according to a first embodiment of the present invention.

An engine 1 in FIG. 1 is a so-called cylinder injection type spark ignition engine that supplies fuel directly into cylinders, and is capable of selectively switching fuel injection mode between an intake stroke injection mode, in which fuel is injected during an intake stroke, and a compression stroke injection mode, in which fuel is injected during a compression stroke.

The engine 1 is capable of operating at a stoichiometric air-fuel ratio (stoichiometric airfuel ratio operation), a rich airfuel ratio (rich air-fuel ratio operation), and a lean air-fuel ratio (lean air-fuel ratio operation). The engine 1 is capable of changing the operation mode among the above operation modes according to conditions found from a variety of parameters.

An ignition plug 4 and a fuel injection valve 6 are attached to a cylinder head 2 of each cylinder of the engine 1. An ignition coil 8 that outputs high voltage is connected to the ignition plug 4.

A fuel supply device, not shown, is connected to the fuel injection valve 6 via a fuel pipe 7. The fuel supply device is comprised of a low-pressure fuel pump and a high-pressure fuel pump, so that fuel in a fuel tank is pressurized to be low-pressure fuel or high pressure fuel, which is then supplied to the fuel injection valve 6 via the fuel pipe 7.

The cylinder head 2 of each cylinder is formed with an intake port 9 substantially in the vertical direction, and one end of an intake manifold 10 is connected to the upper end of each intake port 9. As shown in FIG. 1, the intake manifold 10 is provided with a drive-by-wire type throttle valve (ETV) 14 that controls the intake air quantity, a throttle position sensor (TPS) 16 that detects the angle of opening of the throttle valve 14, and an intake air quantity sensor (air flow sensor or AFS) 18 (used mainly for fuel control by an L-jetronic method) that measures the intake air quantity. Further, a pressure sensor 44 (used mainly for fuel control by a speed density method (D-jetronic method)) that detects the pressure (negative pressure) inside the intake manifold 10.

The cylinder head 2 of each cylinder is also formed with an exhaust port 11, and an exhaust manifold 12 is connected to each exhaust port 11. An exhaust pipe (exhaust passage) 20 is connected to the exhaust manifold 12, and a three-way catalyst 30 (hereinafter called "catalytic converter" or simply called "catalyst") that purifies toxic substances in exhaust gas is disposed in the exhaust pipe 20.

The three-way catalyst 30 is comprised of copper (Cu), cobalt (Co), argentums (Ag), platinum (Pt), rhodium (Rh), paradigm (Pd), or iridium (Ir) as an active noble metal that is held on a carrier, and is capable of oxidizing HC and CO in exhaust gas and reducing and removing $NO_X$. Further, the exhaust pipe 20 is provided with an $O_2$ sensor 22.

An ECU 40 is comprised of an input/output device, a storage device (such as a ROM, a RAM, or a non-volatile RAM), a central processing unit (CPU), a timer counter, and so forth, and controls overall operations of the engine 1.

A variety of sensors such as the above-mentioned TPS 16, intake air quantity sensor 18, $O_2$ sensor 22, pressure sensor 44, and a crank angle sensor 42 that detects the crank angle of the engine 1 are connected to the input side of the ECU 40, and detection information acquired by these sensors is inputted to the input side of the ECU 40. It should be noted that the engine speed Ne is calculated based on the crank angle detected by the crank angle sensor 42.

The ECU 40 is also provided with a combustion state control element 410 (refer to FIG. 2) that controls the combustion state of the engine 1. The combustion state control element 410 controls at least one of the quantity of air taken into the engine 1 and the quantity of fuel supplied to the engine 1 to thereby control the combustion state of the engine 1.

On the other hand, a variety of output devices such as the above-mentioned fuel injection valve 6, ignition coil 8, and throttle valve 14 are connected to the output side of the ECU 40. Theses output devices cause the combustion state control element 410 to calculate or set the air-fuel ratio (A/F) based on information acquired from the variety of sensors. The ECU 40 provides control to set the fuel injection quantity (the drive pulse width of the fuel injection valve 6), the throttle angle, and so forth so that the A/F calculated or set by the combustion state control element 410 can be achieved, and outputs signals indicative of the fuel injection timing, the ignition timing, and so forth. As a result, a proper quantity of fuel is injected from the fuel injection valve 6 in proper timing, and the throttle valve 14 is actuated to be opened and closed such that the throttle valve 14 is opened at a proper angle in proper timing.

Further, the engine 1 is capable of providing so-called deceleration fuel cut control (or simply called "fuel cut") in which the supply of fuel is shut off in decelerating so as to improve the fuel economy.

Figure 2:
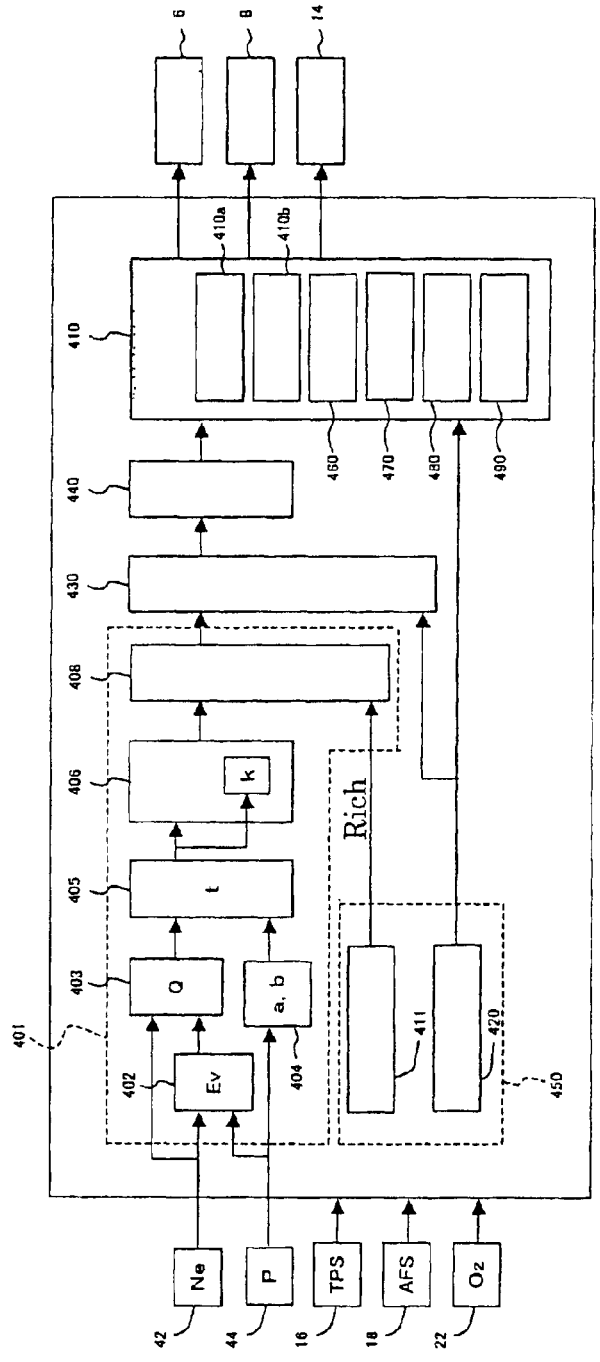
FIG. 2 is a block diagram schematically showing essential parts of the catalyst deterioration suppressing apparatus according to the first embodiment.

Specifically, as shown in FIG. 2, an operative state detecting element 450 that detects or determines the operative state of the engine 1 is provided in the ECU 40. The operative state detecting element 450 is provided with a combustion state determining element 411 and a decelerating state detecting element (or a decelerating state determining element) 420 that detects (or determines) whether the vehicle is decelerating or not.

An accel angle sensor, not shown, that detects or determines the position of an accel pedal depressed by the driver and the state of the pedal depression by the driver, a vehicle speed sensor, not shown, that detects the vehicle speed, an engine speed sensor (the crank angle sensor 42) that detects the engine speed Ne, and so forth are connected to the decelerating state detecting element 420.

If the vehicle speed is detected to be equal to or greater than a predetermined value and the driver has stopped depressing the accelerator pedal (accel OFF). The decelerating state detecting element 420 determines that the vehicle lies in a decelerating running state (or simply called "decelerating state"). Further, when it is detected that the engine speed Ne is equal to or greater than a predetermined engine speed in the case where it is determined that the vehicle lies in the decelerating state, the combustion state control element 410 prohibits the injection of fuel from the fuel injection valve 6 to cut fuel in decelerating.

The combustion state control element 410 is provided with a fuel supply stop element 410a that outputs a signal which causes the supply of fuel to the engine 1 to be stopped in the case where it is determined that the vehicle lies in the decelerating state and the engine speed Ne is equal to or greater than a predetermined engine speed.

It should be noted that in the present embodiment, the deceleration fuel cut control is provided for all of cylinders, but may be provided for only part of cylinders.

The combustion state control element 410 is provided with a fuel supply stop inhibiting element 410b that prohibits the fuel supply stop element 410a to stop the supply of fuel even when the vehicle is decelerating.

Further, as shown in FIG. 2, the ECU 40 is provided with a catalyst temperature estimating element 401 that estimates the temperature of the catalyst 30. When the catalyst temperature estimating element 401 estimates that the catalyst temperature is equal to or greater than a predetermined temperature, fuel cut in decelerating is prohibited by the fuel supply stop prohibiting element 410b so as to protect the catalyst 30 even if it is determined that the vehicle is decelerating.

This is intended to suppress heat-deterioration of the catalyst 30. Specifically, when fuel is cut when decelerating, only air is emitted from the cylinder or cylinders for which fuel has been cut, and hence the exhaust air-fuel ratio becomes lean (oxidized atmosphere), so that the catalyst 30 is likely to be heat-deteriorated.

Therefore, as described above, when the temperature of the catalyst 30 is high, i.e. when the temperature of the catalyst 30 is equal to or higher than a predetermined temperature, fuel is injected with fuel cut in decelerating being prohibited even when the engine 1 is decelerating, so that heat-deterioration of the catalyst 30 can be suppressed.

Note that how the catalyst temperature estimating element 401 estimates the temperature of the catalyst 30 will be described later.

As shown in FIG. 2, the combustion state control element 410 is provided with a target intake air quantity setting element 460, a target air-fuel ratio setting element 470, a fuel injection quantity setting element 480, and a feedback control prohibiting element 490 in addition to the above-mentioned fuel supply stop element 410a and fuel supply stop prohibiting element 410b.

The target intake air quantity setting element 460 sets the target intake air quantity based on the operative state of the engine 1, engine speed information acquired from the crank angle sensor (engine speed sensor) 42, and accelerator pedal depression information acquired from an accelerator pedal stroke sensor, not shown.

When the target intake air quantity setting element 460 has set the target intake air quantity, the angle of opening of the ETV 14 is set to achieve the target intake air quantity, and an actuator intended to drive the ETV 14 is controlled based on a map, not shown, whose parameters are the engine speed and the target intake air quantity.

Further, the AFS 18 is capable of detecting the actual intake air quantity, and a deviation between the actual intake air quantity and the above-mentioned target intake air quantity is calculated based on respective values thereof, and the angle of opening of the ETV 14 is corrected so that the deviation can be 0.

The target air-fuel ratio setting element 470 is intended to set the target air-fuel ratio (target A/F) based on the engine speed information, and throttle angle information or actual intake air quantity detected by the AFS 18, and so forth. When the target air-fuel ratio setting element 470 has set the target air-fuel ratio, the fuel injection quantity setting element 480 sets the fuel injection quantity so that the actual air-fuel ratio can be equal to the target air-fuel ratio. The drive pulse width of the fuel injection valve 6 is then set so that the set fuel injection quantity can be achieved.

The fuel injection quantity setting element 480 is provided with feedback on the actual air-fuel ratio based on detection information acquired from the $O_2$ sensor 22. Specifically, the actual air-fuel ratio is detected from the concentration of oxygen in exhaust gas, which is acquired from the $O_2$ sensor 22, and the fuel injection quantity is feedback-controlled to eliminate a deviation between the actual air-fuel ratio and the target air-fuel ratio.

The feedback control prohibiting element 490 is intended to prohibit the fuel injection quantity from being feedback-controlled in a predetermined engine operative state. While fuel cut when decelerating is prohibited (i.e. when the fuel supply stop prohibiting element 410b prohibits the supply of fuel from being stopped, in other words, when the engine speed Ne is equal to or higher than a predetermined speed and the catalyst temperature is equal to or higher than a predetermined temperature while the engine 1 is decelerating (the accel is OFF and the vehicle speed is high, i.e. the vehicle speed is equal to or higher than a predetermined speed)), the feedback control prohibiting element 490 prohibits the fuel injection quantity setting element 480 from feedback-controlling the fuel injection quantity, and provides open-loop control.

Figure 6:
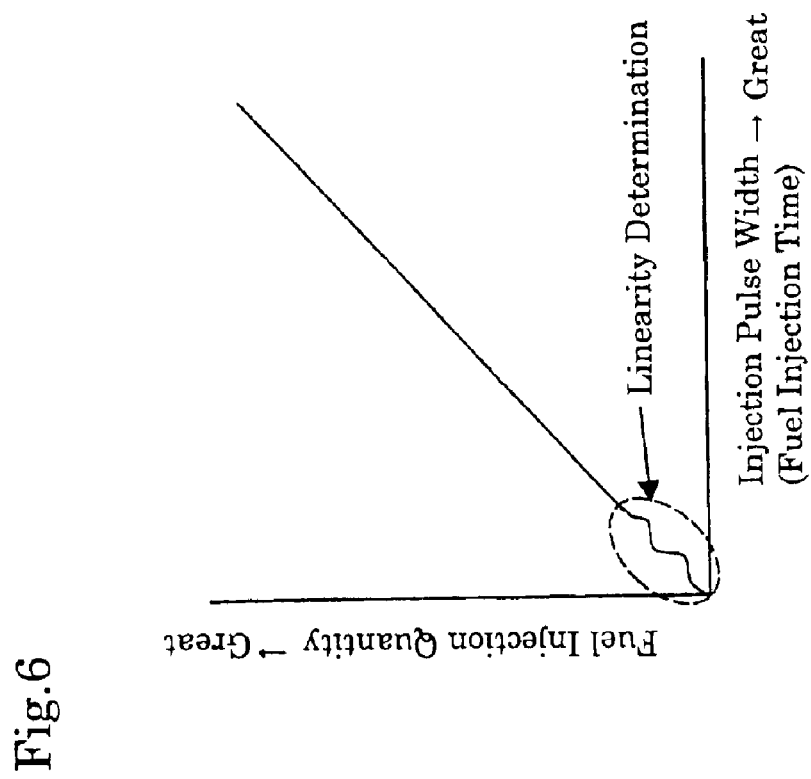
FIG. 6 is a diagram useful in explaining problems to be solved by the present invention, showing the relationship between the fuel injection time and the fuel injection quantity of an injector.

This is because, while the declaration fuel cut is prohibited, the engine 1 is operated in an operative range where the intake air quantity and the fuel injection quantity are very small due to releasing of the accelerator pedal. In such an operative range, the linearity of the fuel injection quantity with respect to the injector pulse width deteriorates (refer to FIG. 6), and if the fuel injection quantity is feedback controlled in this operative range, exhaust gas may be deteriorated, the air-fuel ratio may be controlled in a stable manner, and in the worst case, engine blowout may occur. This is because, due to feedback-control, the actual fuel injection quantity is not increased as desired even if the injector pulse width is increased for the purpose of increasing the fuel injection quantity, or on the contrary, the actual fuel injection quantity is not decreased as desired or is decreased excessively even if the injector pulse width is decreased for the purpose of reducing the fuel injection quantity.

Therefore, in the present embodiment, the air-fuel ratio is prohibited from being feedback controlled in the above-mentioned operative range, thus preventing the air-fuel ratio control from becoming unstable to inhibit the air-fuel ratio from becoming lean, so that heat-deterioration of the catalyst 30 can be suppressed.

Further, when the fuel injection quantity is prohibited from being feedback controlled as described above, the fuel injection quantity setting means 480 sets the fuel injection quantity based on the target intake air quantity set by the target intake air quantity setting means 460 such that the air-fuel ratio is rich or stoichiometric.

In the case where the air-fuel ratio is set to a stoichiometric air-fuel ratio, there is the possibility that the air-fuel ratio becomes lean due to an error in air-fuel ratio control or the like, and hence the air-fuel ratio may be open-loop controlled so that the air-fuel ratio can be slightly rich, and not stoichiometric.

Further, when feedback control is prohibited as described above, the air-fuel ratio may be open-loop controlled based on the actual intake air quantity detected by the AFS 18 instead of the target intake air quantity set by the target intake air quantity setting element 460.

A description will now be given of how the temperature of the catalyst 30 is estimated. As shown in FIG. 2, the ECU 40 is comprised of the catalyst temperature estimating element 401 that estimates the temperature of the catalyst 30 based on the engine load L and the exhaust flow Q.

Figure 3:
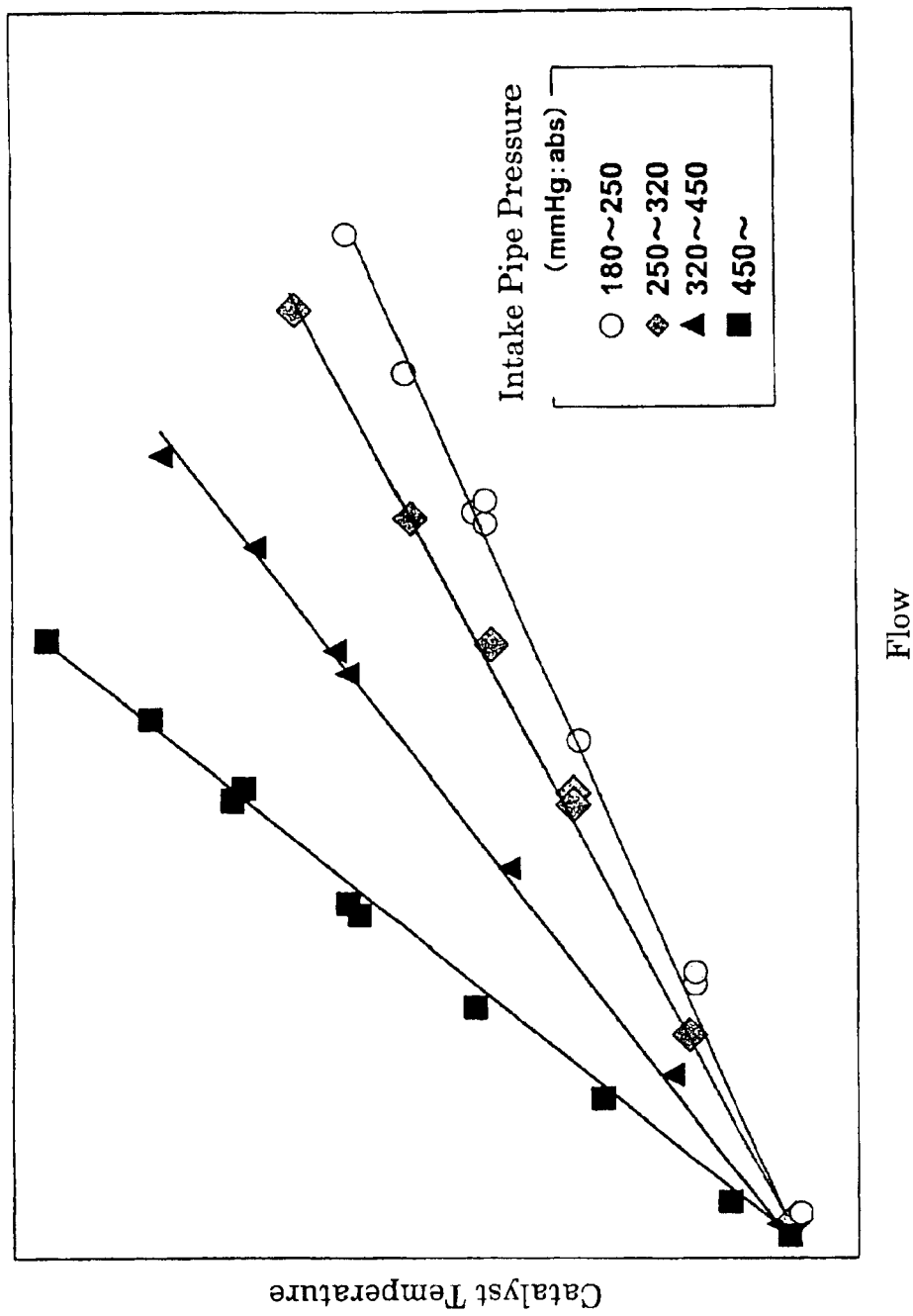
FIG. 3 is a diagram showing data on catalyst temperatures measured in a process of inventing the catalyst deterioration suppressing apparatus according to the first embodiment.
Figure 4:
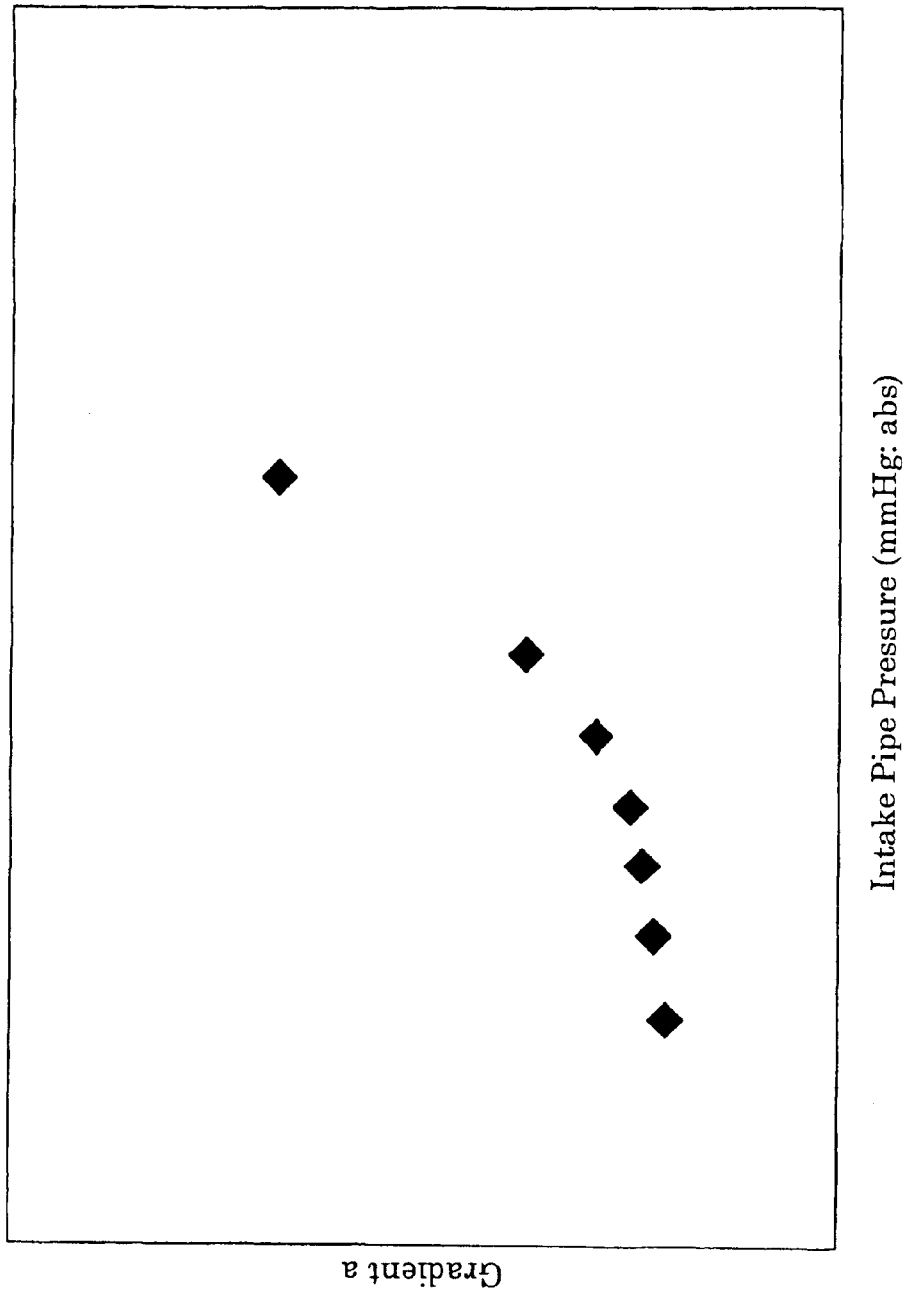
FIG. 4 is a diagram showing an example of a map that is stored in a constant storage means of the catalyst deterioration suppressing apparatus according to the first embodiment.

FIG. 3 shows data on catalyst temperatures measured in running tests or the like. As is apparent from FIG. 3, there is a linear correlation between the exhaust flow and the catalyst temperature with the intake pipe pressure (engine load) being used as a parameter. By utilizing this characteristic, the catalyst temperature estimating element 401 estimates the catalyst temperature.

Specifically, where the catalyst temperature is designated by t and the exhaust flow is designated by Q, the test result in FIG. 3 proves that there is a linear correlation between the catalyst temperature t and the exhaust flow Q as expressed by the following equation:

$$t = aQ + b \quad (1)$$

In the above expression, values a and b can be calculated from measured data in an actual vehicle ride test by least squaring, and the values a are stored in advance in the form of a map showing the relationship with the intake pipe pressure in a constant storing element 404 of the catalyst temperature estimating element 401. Namely, the value a is set according to the intake pipe pressure as the engine load L. It should be noted that the value a may be set according to a value which is correlated to the engine load, such as the volume efficiency Ev, the intake air quantity, or the throttle angle. Similarly, the value b may also be set according to the engine load L.

Further, the catalyst temperature estimating element 401 is provided with a volume efficiency map 402 for use in finding the volume efficiency Ev as the engine load L. The volume efficiency Ev is found from the intake pipe pressure P and the engine speed Ne based on information stored in the volume efficiency map 402.

Further, the catalyst temperature estimating element 401 is provided with an exhaust flow calculating element 403 that calculates the exhaust flow Q according to the following equation using the engine speed Ne and the volume efficiency Ev:

$$Q = 1/2 \times \text{total displacement} \times (Ne/60) \times Ev \quad (2)$$

where the measure of the engine speed Ne is rpm.

As described above, the volume efficiency Ev is applied as the engine load L, and the exhaust flow is calculated based on the volume efficiency Ev. In the speed density method (D-jetronic method), the volume efficiency Ev (engine load L) is found from the engine speed Ne and the intake pipe pressure, an hence the crank angle sensor 42 and the pressure sensor 44 constitute an engine load detecting element that detects the engine load and an exhaust flow detecting element that detects the exhaust flow Q. It should be noted that the exhaust flow Q may be calculated directly from the intake pipe internal pressure and the engine speed, or may be found from the correlation with the intake air flow detected by the intake air flow sensor 18 in the case of the L-jetronic method.

Further, a sensor which serves as an exhaust flow detecting element to actually detect the exhaust flow Q may be provided in the exhaust passage 20, or the exhaust flow Q may be found from map values correlated with the exhaust flow.

Further, any values such as the intake pipe pressure, the intake air quantity, the throttle angle, and the target Pe as well as the volume efficiency Ev may be used as parameters representing the engine load insofar as they are correlated with the engine load.

Referring to FIG. 2, a description will now be given of how the catalyst temperature is estimated. As shown in FIG. 2, the catalyst temperature estimating element 401 is provided with an estimated temperature calculating element 405 that obtains the estimated temperature t by calculation. The estimated temperature calculating element 405 calculates the catalyst temperature t according to the above equation (1).

Further, the catalyst temperature estimating element 401 is provided with a filtering processing element (catalyst temperature correcting element) 406 that performs filtering processing on the catalyst temperature calculated by the estimated catalyst temperature calculating element 405. When the catalyst temperature has been estimated by calculation as described above, the filtering element 406 performs filtering processing to stabilize the estimated catalyst temperature.

Specifically, the filtering processing element 406 calculates the catalyst temperature filtered value according to the following equation (3):

$$\text{catalyst temperature filtered value } t_0(n) = (1-k)\text{catalyst temperature filtered value } t_0(n-1) + k \text{ estimated temperature t} \quad (3)$$

where k is a filter constant (gain). The catalyst temperature filtered value to obtained by the filtering processing element 406 is outputted again as the catalyst temperature.

The filtering processing element 406 is provided with a filter constant changing element 407 that changes the filter constant according to changes in temperature of the catalyst 30. The filter constant changing element 407 is comprised of a catalyst temperature status detecting element, not shown, that determines whether the temperature of the catalyst 30 is increasing or decreasing, and changes the filter constant k according to the result of detection by the catalyst temperature status detecting element.

In this case, if the temperature of the catalyst 30 is increasing, the catalyst temperature is corrected such that the responsiveness of the catalyst temperature calculated by the catalyst estimated temperature calculating element 405 is higher than in the case where the temperature of the catalyst 30 is decreasing. Specifically, when the catalyst temperature is increasing, the filter constant k is set to be greater than in the case where the catalyst temperature is decreasing.

This is because the temperature status changing mechanism differs greatly according to whether the temperature of the catalyst 30 is increasing or decreasing. Specifically, when the temperature of the catalyst 30 is increasing, the temperature of the catalyst 30 changes with a high responsiveness (i.e. a greater gain) due to heating by exhaust gas and heating by heat of reaction (heat of combustion of unburned substances such as HC, $CO_2$, and $H_2$) on the catalyst 30, and on the contrary, when the temperature of the catalyst 30 is decreasing, the temperature of the catalyst 30 changes with a relatively low responsiveness (i.e. a smaller gain) due to radiation to exhaust gas and radiation from a casing for the catalyst 30 to the air). In particular, the heat of reaction on the catalyst 30 reacts at a high speed and also responds at a high speed.

Of course, the above described "heating from exhaust gas and heating by heat of reaction on the catalyst 30" and "radiation to exhaust gas and radiation from a casing for the catalyst 30 to the air" occur irrespective of whether the catalyst temperature is increasing or decreasing, but when the catalyst temperature is increasing, the amount of radiation should be greater than the amount of heating, and hence the relative balance between the amount of heating and the amount of radiation differs according to whether the catalyst temperature is increasing or decreasing.

For this reason, if the same filter constant k is used when the catalyst temperature is increasing and when the catalyst temperature is decreasing, it is difficult to correctly estimate the catalyst temperature due to an error in temperature estimation. This has already been proved by experiments. Accordingly, in the present embodiment, different filter constant k is set according to whether the temperature of the catalyst 30 is increasing or decreasing, so that the catalyst temperature can be estimated as correctly as possible.

In this case, whether the catalyst temperature is increasing or decreasing may be determined according to either a difference between the present value and the previous value of the catalyst temperature t obtained by the above equation (1), or a difference between the present (n) value and the previous (n−1) value of the catalyst temperature filtered value to obtained by the above equation (3). However, since the catalyst temperature can be estimated more correctly by determining the filter constant k immediately before each filtering processing, it is preferred that whether the catalyst temperature is increasing or decreasing is determined according to a difference between the present value and the previous value of the catalyst temperature t.

On the other hand, as described above, the ECU 40 is provided with the combustion state determining element 411 that determines the combustion state of the engine 1. A second catalyst temperature correcting element 408 that further corrects the estimated catalyst temperature is provided in the catalyst temperature estimating element 401. If the combustion state determining element 411 determines that the engine 1 is combusting fuel at a rich air-fuel ratio, the second catalyst temperature correcting element 408 corrects the catalyst temperature to a lower temperature.

This is because the exhaust temperature is lowered due to cooling by fuel in the cylinders since the quantity of fuel is relatively large when the engine 1 is operating at a rich air-fuel ratio.

When the engine 1 is operating at a rich air-fuel ratio, the second catalyst temperature correcting element 408, for example, multiplies the estimated catalyst temperature filtered by the filtering processing element 406 by a predetermined value (e.g. 0.85) to correct the catalyst temperature.

It should be noted that the second catalyst temperature correcting element 408 should not necessarily correct the catalyst temperature in the above-mentioned manner, but for example, may correct the catalyst temperature by changing the values a and b in the above equation (1). In this case, the values a and b are each multiplied by a coefficient equal to or smaller than 1 to correct the catalyst temperature. Alternatively, the value obtained by the above equation (1) may be multiplied by a predetermined value (e.g. 0.85) to correct the catalyst temperature.

Then, if it is determined that the catalyst temperature estimated (calculated) in the above-mentioned manner is equal to or greater than a predetermined value, the combustion state control element 410 prohibits fuel cut in decelerating so as to protect the catalyst 30 even if the decelerating state detecting element 420 determines that the engine 1 is decelerating.

Further, the ECU 40 is provided with a limiting element 440 that limits the catalyst temperature t estimated by the catalyst temperature estimating element 401 with the upper limit value and the lower limit value. The limiting element 440 clips the catalyst temperature with the upper and lower limit values.

The limiting element 440 is comprised of a minimum value selecting element, not shown, that compares the estimated temperature t with the upper limit value $t_{MAX}$ and outputs a smaller one of the two values, and a maximum value selecting element, not shown, that compares the estimated temperature t with the lower limit value $t_{MIN}$ and outputs a greater one of the two values. The minimum value selecting element and the maximum value selecting element limit the upper and limit values of the estimated temperature t.

It should be noted that the clip values (the upper limit value $t_{MAX}$ and the lower limit value $t_{MIN}$) may differ according to whether the air-fuel ratio is stoichiometric or rich. This is because the catalyst 30 is expected to be cooled by fuel and decreased in temperature to a larger degree when the air-fuel ratio is richer than when the air-fuel ratio is stoichiometric. In this case, the clip value is greater when the air-fuel ratio is stoichiometric than when the air-fuel ratio is rich.

The ECU 40 is also provided with an estimated catalyst temperature changing element 430. If the decelerating state detecting element 420, provided in the operative state detecting element 450, detects or determines that the engine 1 is decelerating, the estimated catalyst temperature changing element 430 sets the catalyst temperature t to a predetermined value (for example, a fixed value of 650° C.) in place of the value set by estimation based on the engine load and the exhaust flow (estimated in the normal operative state) as described above.

This is because there is a great error in temperature estimation according to the above-mentioned temperature estimation equation [1] for the reasons ① through ③ described below.

① When decelerating, the intake air quantity and the fuel injection quantity are small, and hence the combustion state is worse than in the normal operative state. For this reason, the exhaust temperature and unburned substances (reacted on the catalyst 30) in exhaust gas as well as the catalyst temperature are different from those in the normal operative state.

② When decelerating, the intake air quantity, i.e. the exhaust flow is small and the catalyst 30 is cooled (deprived of heat) by exhaust flow to a smaller degree than in the normal operative state, the catalyst temperature is different from that in the normal operative state. Note that cooling the catalyst 30 by exhaust flow means that the catalyst 30 is deprived of heat by exhaust flow and is therefore cooled when the catalyst temperature is higher than the exhaust temperature due to heat of reaction on the catalyst 30.

③ In particular, when fuel is cut, neither fuel injection nor combustion is carried out, and hence the exhaust temperature itself is different from that in the normal operative state (during combustion), and the catalyst temperature is entirely different from that in the normal operative state.

In addition to the reasons ① through ③ described above, the degree to which heat is generated by catalytic reaction highly depends on the catalyst temperature when decelerating. Specifically, as the catalyst temperature increases, the degree to which the catalyst 30 is activated becomes greater, and hence unburned components (HC, CO, and $H_2$) in exhaust gas react actively to further increase the catalyst temperature.

Further, the quantity of heat on the carrier (including a wash coat) of the catalyst 30 at the start of control for cutting fuel or control for prohibiting fuel cut is correlated with the catalyst temperature (more precisely, the catalyst temperature at the start of decelerating) although the catalyst temperature is increased due to heat radiation during control for cutting fuel or control for prohibiting fuel cut.

For the reasons described above, the heat of reaction on the catalyst 30 greatly affects the catalyst temperature when it is determined that the engine 1 is decelerating, and hence it is difficult to accurately estimate the catalyst temperature according to the above-mentioned estimated temperature calculating equation (1).

Therefore, in the present embodiment, the estimated catalyst temperature is set to a predetermined temperature $t_1$ (e.g., 650° C.) when the engine 1 is decelerating.

It should be noted that in the above described example, the predetermined temperature $t_1$ is a fixed value, but the predetermined temperature $t_1$ may be set as a map showing the relationship with the estimated catalyst temperature t (the estimated temperature calculated according to the above equation (1)) calculated when it is determined that the engine 1 is decelerating. Further, the predetermined value $t_1$ may be set as a map showing the relationship with any one of the catalyst temperature, exhaust flow, air-fuel ratio, fuel injection quantity, and capacity of the catalytic carrier (including a wash coat) when it is determined that the engine 1 is decelerating. Among the above-mentioned parameters, the capacity of the catalytic carrier is not variable according to the driving condition but is constant, and hence if the capacity of the catalytic carrier is used in combination with other parameters.

Alternatively, the decelerating state determining element 420 provided in the operative state detecting element 450 may determine whether fuel is being cut or not (i.e. the accelerator pedal is released, the engine speed Ne is equal to or greater than a predetermined speed, and the catalyst temperature is less than a predetermined value), or whether or not fuel cut is being is being prohibited or not (i.e. the accelerator pedal is released, the engine speed Ne is equal to or greater than a predetermined speed, and the catalyst temperature is equal to or greater than a predetermined value), so that the predetermined value $t_1$ can be set to different values according to results of the determination. In this case, it is preferred that during fuel cut when decelerating, the estimated catalyst temperature is set to a different value from, i.e. a smaller value than the estimated catalyst temperature obtained when fuel cut is prohibited. This is because combustion is not performed with fuel injection being prohibited during fuel cut when decelerating, and hence the exhaust temperature is different from that in the case where fuel cut is prohibited (during combustion), and the catalyst temperature is greatly different from that in the case where fuel cut is prohibited (during combustion).

If the estimated temperature t of the catalyst 30 is equal to or greater than a predetermined value (threshold) T as described above, the fuel supply stop prohibiting element 410b provided in the combustion state control element 410 prohibits fuel cut when decelerating so as to protect the catalyst 30 even if it is determined that the engine 1 is decelerating. In this case, feedback control of the air-fuel ratio is prohibited so that the engine 1 can be operated at a rich or stoichiometric air-fuel ratio by open-loop control.

It should be noted that the threshold T is set to a temperature (lean heat-resisting temperature) at which the catalyst 30 starts deteriorating in lean atmosphere. The threshold T is between approximately 700 to 900° C. although it differs according to catalysts.

A description will now be given of the operation of the catalyst deterioration suppressing apparatus according to the present embodiment of the present invention constructed as described above.

First, the temperature of the catalyst 30 is estimated. Specifically, the volume efficiency Ev (engine load L) is found with reference to the volume efficiency map 402 according to the engine speed N3 and the intake pipe pressure P detected by the crank angle sensor 42 and the pressure sensor 44. Further, the exhaust flow calculating element 403 calculates the exhaust flow Q based on the engine speed Ne and the volume efficiency Ev according to the above equation (2).

On the other hand, the values a and b are set according to the intake pipe pressure P with reference to the map stored in advance in the constant storing element 404. The estimated temperature calculating element 405 then calculates the catalyst temperature t according to the above equation (1) using the values a and b and the exhaust flow Q.

Next, the filtering element 406 performs filtering processing according to the above equation (3) to stabilize the catalyst temperature t. The catalyst temperature filtered value to obtained by the filtering element 406 is outputted again as the catalyst temperature t.

Further, the filter constant k used in the above equation (3) is changed by the filter constant changing element 407 according to a change in temperature of the catalyst 30. In this case, the filter constant k is set to different values according to whether the temperature of the catalyst 30 is increasing or decreasing, and more specifically, the filter constant k is set to a greater value when the catalyst temperature is increasing than when the catalyst temperature is decreasing.

Further, when the combustion state determining element 411 determines that the air-fuel ratio of the engine 1 is rich, the second catalyst temperature correcting element 408 corrects the catalyst temperature t to a lower temperature considering that the exhaust temperature is decreased by fuel (cooling by fuel). In this case, for example, the catalyst temperature is corrected by multiplying the value calculated according to the above equation (1) by a predetermined value (e.g., 0.85).

Further, if the decelerating state detecting element 420 detects or determines that the engine 1 is decelerating, the estimated catalyst temperature changing element 430 sets the estimated catalyst temperature to, for example, the predetermined value t1 (e.g., 650° C.) in place of the catalyst temperature t estimated in the above described manner, and the estimated catalyst temperature t1 is set based on the result of a determination as to whether fuel is being cut or not or whether fuel cut is being prohibited or not. Thereafter, the limiting element 440 clips the catalyst temperature t with the upper limit value and the lower limit value.

Figure 5:
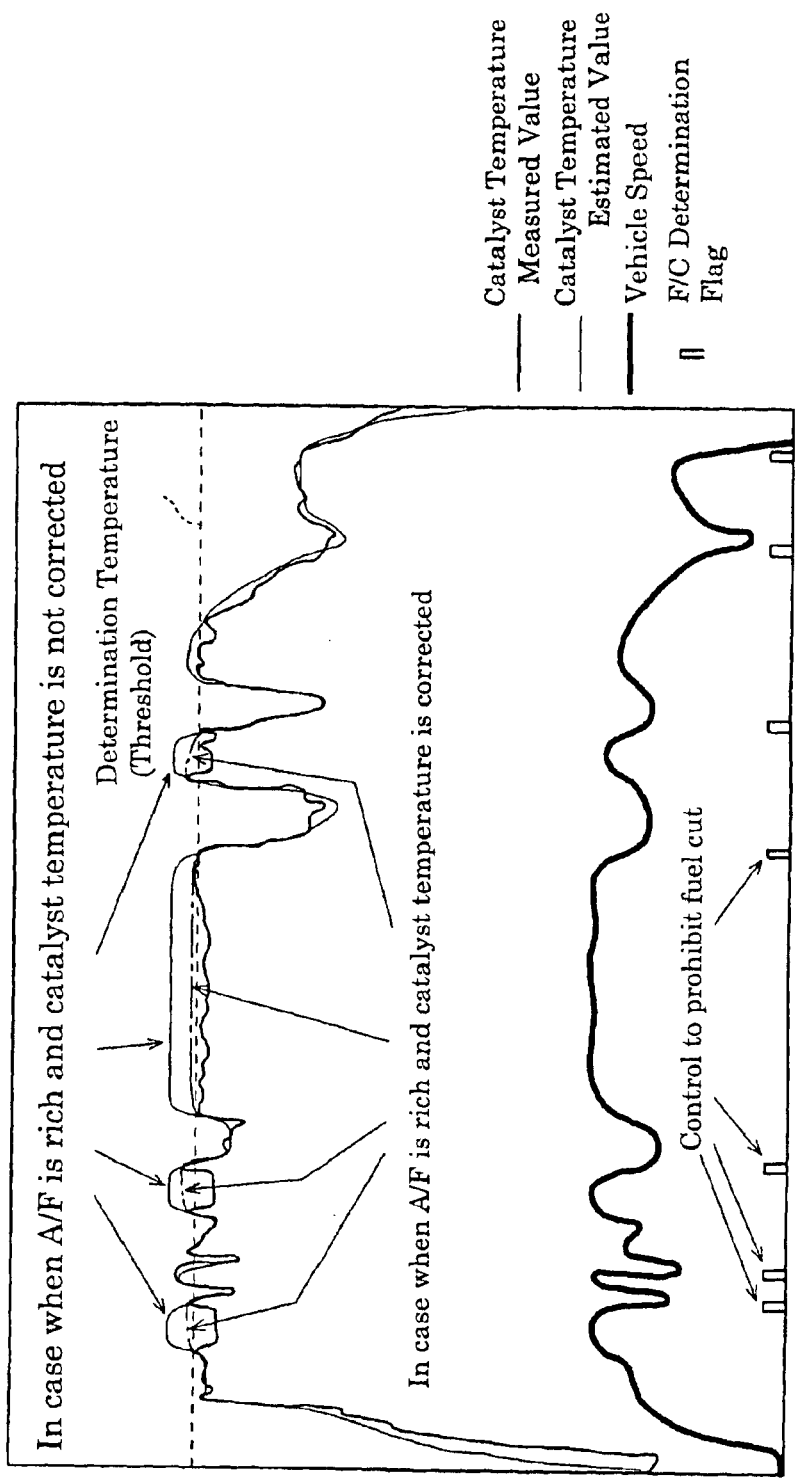
FIG. 5 is a diagram useful in explaining the operation and effects of the catalyst deterioration suppressing apparatus according to the first embodiment.

FIG. 5 is a diagram showing the relationship between measured temperatures of the catalyst 30 and the catalyst temperatures t obtained by the above equation (1). As shown in FIG. 5, according to the present invention, the temperature of the catalyst 30 can be estimated with a high accuracy. It should be noted that the catalyst temperature is relatively higher than the measured value when the air-fuel ratio is rich and the catalyst temperature is not corrected, but as described above, the catalyst temperature correcting element 408 corrects the catalyst temperature t to a lower temperature (correction at a rich air-fuel ratio) so that the catalyst temperature approximate to the measured value can be obtained even when the air-fuel ratio is rich.

If the catalyst temperature t estimated in this way is equal to or greater than the predetermined value T, the fuel supply stop prohibiting element 410b provided in the combustion state control element 410 prohibits fuel cut in decelerating and prohibits feedback control of the air-fuel ratio so as to protect the catalyst 30 even if the decelerating state detecting element 420 determines that the engine 1 is decelerating.

Further, when fuel cut in decelerating is prohibited, i.e. when the temperature of the catalyst 30 is equal to or higher than a predetermined temperature, the fuel injection quantity is set by open-loop control such that the air-fuel ratio is rich or stoichiometric.

As described above, when the temperature of the catalyst 30 is equal to or greater than a predetermined temperature during deceleration, the catalyst deterioration suppressing apparatus according to the embodiment of the present invention prohibits the fuel supply stop element 410a from stopping the supply of fuel and also prohibits feedback control of the air-fuel ratio, thus suppressing as much as possible air-fuel ratio feedback control from becoming unstable in the operative range where the linearity of the fuel injection quantity with respect to the injector pulse width deteriorates, so that the air-fuel ratio can be controlled in a stable manner. This makes it possible to inhibit the air-fuel ratio from becoming lean, and to suppress heat deterioration of the catalyst 30.

Further, when feedback control is prohibited as mentioned above, the fuel injection quantity is set based on the target intake air quantity set by the target intake air quantity setting element 460 and the actual intake air quantity detected by the AFS 18 such that the air-fuel ratio is rich or stoichiometric, and as a result, it is possible to reliably inhibit the air-fuel ratio from becoming lean.

In the present embodiment, since the temperature of the catalyst 30 is estimated based on the engine load (intake pipe pressure) and the exhaust flow Q, there is no necessity of providing any temperature sensor to estimate the catalyst temperature, and hence the cost increase can be avoided.

Further, in the present embodiment, since the exhaust flow Q is used as one of the parameters in estimating the temperature of the catalyst 30 with the fact that the catalyst 30 is cooled by exhaust flow being taken into consideration, it is possible to accurately estimate the catalyst temperature. Further, since the catalyst temperature can be estimated accurately, it is possible to reliably prevent heat deterioration of the catalyst 30 and to provide accurate control such that t fuel is cut only when necessary (only when the temperature of the catalyst 30 is equal to or greater than a predetermined temperature).

Further, since the catalyst temperature is subjected to filtering, it is possible to stabilize the catalyst temperature and to further improve the accuracy in estimating the catalyst temperature.

Further, in the case where the temperature of the catalyst 30 is increasing, the estimated temperature is corrected such that the responsiveness of the catalyst temperature is higher than in the case where the temperature of the catalyst 30 is decreasing, and hence it is possible to estimate the catalyst temperature with a high accuracy. Specifically, when the temperature of the catalyst 30 is increasing, the catalyst temperature changes with a relatively high responsiveness due to heating by exhaust gas and heating by reaction on the catalyst 30, whereas when the temperature of the catalyst 30 is decreasing, the catalyst temperature changes with a relatively low responsiveness since the catalyst temperature is only decreased due to radiation to exhaust gas and radiation in the air. Therefore, it is possible to correctly estimate the catalyst temperature by correcting the catalyst temperature such that the responsiveness thereof is higher when the catalyst temperature is increasing than when the catalyst temperature is decreasing.

Specifically, by setting the filter constant according to a change in temperature of the catalyst 30 (according to whether the temperature of the catalyst 30 is increasing or decreasing), the catalyst temperature can be estimated with a higher accuracy.

Further, since the estimated catalyst temperature is corrected to a lower temperature when combustion is carried out at a rich air-fuel ratio, which means that a decrease in temperature caused by cooling with fuel is taken into consideration, it is possible to estimate the catalyst temperature with a high accuracy.

Further, during deceleration, since the catalyst temperature is set to a value (for example, the predetermined value $t_1=650°$ C.) calculated in a different manner from the above equation (1), it is possible to accurately estimate the temperature of the catalyst 30 even during deceleration. Specifically, during deceleration, the exhaust temperature and unburned components in exhaust gas are different from those in the normal operative state, and the catalyst 30 is cooled (deprived of heat) to a smaller degree by exhaust flow than in the normal operative state, and hence if the catalyst temperature is estimated according to the above equation (1), there is a great error in temperature estimation.

To address this problem, according to the present invention, during deceleration, the catalyst temperature estimated in normal operation is changed to another value, and therefore it is possible to accurately estimate the catalyst temperature even during deceleration.

Further, if it is configured such that the predetermined value t1 of the catalyst temperature is set to different values according to results of the determination as to whether or not fuel is being cut or whether or not fuel cut is being prohibited, it is possible to estimate the catalyst temperature with a higher accuracy even during deceleration.

A description will now be given of a catalyst deterioration suppressing apparatus according to a second embodiment of the present invention.

In the present embodiment, the combustion state control element 410 in FIG. 2 is provided with a correcting element 410c capable of correcting the amount of control for the ETV 14. When the fuel supply stop prohibiting means 410b prohibits the supply of fuel from being stopped (i.e., when fuel is supplied during deceleration), the opening of the ETV 14 is corrected to be decreased by the correcting means 410c so that the actual intake air quantity can be reduced under the same operative conditions (the same engine speed) as in the case where the supply of fuel is stopped. Further, in this case, in addition to the correction to the opening of the ETV 14, the combustion state control element 410 controls the fuel injection quantity such that the air-fuel ratio is rich or stoichiometric.

Before describing in detail the functions of the correcting element 410c, a brief description will now be given of the operation of the ETV 14 in decelerating in the case where the catalyst temperature is lower than a predetermined temperature. The combustion state control element 410 is provided with means for directly changing the amount of control for the ETV 14 and a dash pot control element 410d capable of indirectly changing the amount of control for the ETV 14. The dash pot control element 410d provides control to slowly close the ETV 14 to inhibit the engine torque from rapidly decreasing when the driver turns off the accelerator to decelerate the engine 1 (this will be hereinafter referred to as "dash pot control").

Specifically, the driver stops depressing the accelerator pedal when decelerating, and in the case where the driver suddenly releases the accelerator, if the ETV 14 is rapidly closed in response to this movement of the accelerator pedal, the feel of excessive deceleration occurs, and the vehicle receives a shock in some cases. Therefore, the dash pot control is provided to inhibit the ETV 14 from being rapidly closed when the accelerator pedal is suddenly released (i.e., the amount of control for the ETV 14 is corrected by a greater amount than in the normal operation).

On the other hand, in the case where the catalyst temperature is equal to or higher than a predetermined temperature, when the decelerating state is detected, the dash pot control element 410d controls the amount of control, i.e., the amount of control for the actuator which drives the ETV 14, so that the ETV 14 is quickly closed. Specifically, when the accelerator pedal is released in the case where the catalyst temperature is equal to or higher than a predetermined temperature, the amount of control for the actuator which drives the ETV 14, which is set by the dash pot control element 410d, is corrected by a small correction amount (increasing amount), so that the ETV 14 is closed more rapidly than in the dash pot control. Further, the correcting element 410c corrects the amount of control such that the throttle valve opening when the accelerator is completely off (i.e., the throttle valve opening in idling) is further reduced. Namely, such correction is made that the lower limit value of the throttle angle opening is decreased.

It should be noted that without using the dash pot control element 410d, the amount of control for the actuator which drives the ETV 14 may be directly corrected such that the opening of the ETV 14 becomes smaller than in the normal operation (when fuel is cut).

Since the correcting element 410c corrects the opening of the ETV 14 in decelerating (the valve closing speed) and the lower limit value of the opening, the quantity of actual intake air supplied to the engine 1 is reduced, so that the fuel injection quantity corresponding to the intake air quantity can be reduced to suppress deterioration of the fuel economy.

A description will now be given of the operation of the catalyst deterioration suppressing apparatus according to the present embodiment constructed as described above.

As is the case with the first embodiment described above, when the estimated catalyst temperature t is equal to or greater than a predetermined value T, the fuel supply stop prohibiting element 410b provided in the combustion state control element 410 prohibits fuel cut in decelerating to protect the catalyst 30 even if the decelerating state detecting element 420 determines that the engine 1 is decelerating.

During deceleration in the case where the catalyst temperature is equal to or higher than a predetermined temperature, the correcting element 410c corrects the amount of control for the ETV 14 such that the actual intake air quantity is reduced. Specifically, the opening of the ETV 14 is set to be smaller than in the normal operation (when fuel is cut). On this occasion, to further reduce the opening of the ETV 14, the opening of the ETV 14 when the accelerator is completely off is corrected to be decreased.

Further, when fuel cut while decelerating is prohibited, i.e., when the catalyst temperature 30 is equal to or higher than a predetermined temperature, the fuel injection quantity is controlled such that air-fuel ratio is rich or stoichiometric.

In this way, in the case where the temperature of the catalyst 30 is equal to or higher than a predetermined temperature when the engine 1 is decelerating, the catalyst deterioration suppressing apparatus according to the present embodiment prohibits the fuel supply stop element 410a from stopping the supply of fuel and corrects the amount of control for the ETV 14 so that that the actual intake air quantity can be reduced. As a result, it is possible to reduce the fuel injection quantity in accordance with the intake air quantity and hence suppress deterioration of the fuel economy. Further, it is possible to inhibit the catalyst 30 from being exposed to lean atmosphere and hence suppress deterioration of the catalyst 30.

Further, in this case, the quantity of fuel to be supplied is controlled such that the air-fuel ratio is stoichiometric or rich, and hence it is possible to inhibit the catalyst 30 from being exposed to lean atmosphere in a more reliable manner.

Further, in this case, corrections are made such that the opening of the ETV 14 set by the dash pot control element 410d is small and that the throttle valve opening (the throttle valve opening in idling), when the accelerator pedal is completely released, is further reduced. As a result, it is possible to easily and reliably reduce the intake air quantity.

It should be understood that the present invention is not limited to the embodiment described above, but various variations of the above described embodiment may be possible without departing from the spirits of the present invention. For example, although in the above described embodiment, the drive-by-wire type ETV is used as the throttle valve 14, but an ordinary cable type throttle valve may be used as the throttle valve 14. Further, it may be determined that the engine is decelerating when fuel cut is allowed (i.e. when the accel is off and the engine speed Ne is equal to or greater than a predetermined value), and in this state, the catalyst temperature may be changed to another value.

Further, although in the above described embodiment, the catalyst temperature estimated based on the engine load and the exhaust flow is corrected differently according to changes in catalyst temperature, the catalyst temperature estimated in other ways and the catalyst temperature detected directly may also be corrected differently according to changes in catalyst temperature. Further, although in the above described embodiment, the so-called cylinder injection type spark ignition internal combustion engine is used as the engine 1, the present invention is not limited to this, but a diesel engine may be used as the engine 1. Further, although in the above described embodiment, the three-way catalyst is used as the catalyst 30, a variety of catalysts such as a $NO_X$ catalyst may be used as the catalyst 30.

Further, the way of estimating or detecting the temperature is not limited to the embodiment described above.

As described above in detail, the catalyst deterioration suppressing apparatus according to the present invention prohibits the supply of fuel from being cut (fuel cut in decelerating) and prohibits feedback control of the air-fuel ratio when the catalyst temperature is high, i.e. is equal to or greater than a predetermined temperature, thus suppressing air-fuel ratio feedback control from becoming unstable in the operative range where the linearity of the fuel injection quantity with respect to the injector pulse width deteriorates, so that stable air-fuel ratio control can be realized. This makes it possible to inhibit the air-fuel ratio from becoming lean, and to suppress catalytic heat deterioration.

Further, according to the present invention, since the fuel injection quantity is set based on the target intake air quantity and the stoichiometric air-fuel ratio when the supply of fuel is prohibited from being stropped, it is possible to reliably inhibit the air-fuel ratio from becoming lean.

What is claimed is:

1. A catalyst deterioration suppressing apparatus that suppresses deterioration of an exhaust purifying catalyst which purifies toxic substances in exhaust gas emitted from an engine, comprising:

a catalyst temperature estimating element that estimates a temperature of the catalyst based on a catalyst temperature status, said catalyst temperature status indicating whether the catalyst temperature is increasing or decreasing;

a fuel supply stopping element that stops supply of fuel to the engine during deceleration;

a fuel supply stop prohibiting element operable when said catalyst temperature estimating element determines that the temperature of the catalyst lies in a high temperature range equal to or greater than a predetermined temperature, for prohibiting said fuel supply stopping element from stopping the supply of fuel;

an air-fuel ratio control element that feedback-controls an air-fuel ratio such that the air-fuel ratio is equal to a target air-fuel ratio set based on an operative state of the engine; and a feedback control prohibiting element operable when said fuel supply stop prohibiting element prohibits the supply of fuel from being stopped, for prohibiting said air-fuel ratio control element from providing feedback control.

2. A catalyst deterioration suppressing apparatus according to claim 1, wherein said air-fuel ratio control element feedback-controls a fuel injection quantity such that the air-fuel ratio is equal to the target air-fuel ratio.

3. A catalyst deterioration suppressing apparatus according to claim 2, wherein said air-fuel ratio control element comprises, a target intake air quantity setting element that sets a target intake air quantity according to an operative state of the engine, and a fuel injection quantity setting element that sets the fuel injection quantity according to the target air-fuel ratio and the target intake air quantity, wherein said air-fuel ratio control element feedback controls the fuel injection quantity set by said fuel injection quantity setting element such that the air-fuel ratio is equal to the target air-fuel ratio.

4. A catalyst deterioration suppressing apparatus according to claim 3, wherein said air-fuel ratio control element is operable when said fuel supply stop prohibiting element prohibits the supply of fuel from being stopped, for setting the fuel injection quantity according to the target intake air quantity and a stoichiometric air-fuel ratio.

5. A catalyst deterioration suppressing apparatus according to claim 1, wherein said air-fuel ratio control element is operable when said feedback control prohibiting element prohibits said air-fuel ratio from providing feedback control, for open-loop controlling the air-fuel ratio.

6. A catalyst deterioration suppressing apparatus according to claim 5, wherein said air-fuel ratio control element is operable when said feedback control prohibiting element prohibits said air-fuel ratio from providing feedback control, for controlling the air-fuel ratio to a stoichiometric air-fuel ratio or to a richer air-fuel ratio than the stoichiometric air fuel ratio.

7. A catalyst deterioration suppressing apparatus according to claim 1, wherein the air-fuel ratio is detected or calculated according to air-fuel ratio information based on an output from an exhaust sensor provided in an exhaust passage.

8. A catalyst deterioration suppressing apparatus that suppresses deterioration of an exhaust purifying catalyst that purifies toxic substances in exhaust from an engine, comprising:

a catalyst temperature estimating element that one of detects and estimates a temperature of the catalyst;

a fuel supply stopping element that stops supply of fuel to the engine during deceleration;

a fuel supply stop prohibiting element operable when said catalyst temperature estimating element determines that the temperature of the catalyst lies in a high temperature range equal to or greater than a predetermined temperature, for prohibiting said fuel supply stopping element from stopping the supply of fuel;

an intake air quantity adjusting element for adjusting a quantity of intake air supplied to the engine; and a correcting element operable when the supply of fuel is prohibited by said fuel supply stop prohibiting element, for correcting an amount of control for said intake air quantity adjusting element such that the quantity of the intake air supplied to the engine is reduced.

9. A catalyst deterioration suppressing apparatus according to claim 8, wherein said correcting element reduces the quantity of the intake air when the supply of fuel is stopped.

10. A catalyst deterioration suppressing apparatus according to claim 8, further comprising:

a dash pot control element that provides dash pot control such that an amount of control for said intake air adjusting element during the deceleration is corrected by a greater amount than in normal operation, wherein said correcting element corrects an amount of control by said dash pot control element.

11. A catalyst deterioration suppressing method that suppresses deterioration of an exhaust purifying catalyst which purifies toxic substances in exhaust gas emitted from an engine, comprising:

stopping supply of fuel to the engine during deceleration;

estimating a temperature of the catalyst based on a catalyst temperature status, said catalyst temperature status indicating whether the catalyst temperature is increasing or decreasing;

prohibiting supply of fuel from being stopped when the temperature of the catalyst lies in a high temperature range equal to or greater than a predetermined temperature; and prohibiting feedback control of an air-fuel ratio when the supply of fuel is prohibited from being stopped.

12. A catalyst deterioration suppressing method according to claim 11, wherein the air-fuel ratio is feedback-controlled by feedback controlling a fuel injection quantity such that the air-fuel ratio is equal to a target air-fuel ratio set according to an operative state of the engine.

13. A catalyst deterioration suppressing method according to claim 12, wherein the air-fuel ratio is feedback controlled by setting the fuel injection quantity according to the target air-fuel ratio and the target intake air quantity set according to the operative state of the engine, and the fuel injection quantity, and feedback-controlling the fuel injection quantity such that the air-fuel ratio is equal to the target air-fuel ratio.

14. A catalyst deterioration suppressing method according to claim 11, further comprising:
   open-loop controlling the air-fuel ratio when the feedback control of the air-fuel ratio is prohibited.

15. A catalyst deterioration suppressing method according to claim 14, wherein in the step for open-loop controlling the air-fuel ratio, the air-fuel ratio is controlled to one of a stoichiometric air-fuel ratio and a richer air-fuel ratio than the stoichiometric air fuel ratio.

16. A catalyst deterioration suppressing method for suppressing deterioration of an exhaust purifying catalyst that purifies toxic substances in exhaust from an engine, comprising:
   stopping supply of fuel to the engine during deceleration;
   one of detecting and estimating a temperature of the catalyst;
   prohibiting said fuel supply stopping element from stopping the supply of fuel when said catalyst temperature estimating element determines that the temperature of the catalyst lies in a high temperature range equal to or greater than a predetermined temperature; and
   reducing a quantity of intake air supplied to the engine when the supply of fuel is prohibited.

* * * * *